United States Patent
Fomenko et al.

(10) Patent No.: US 10,334,004 B2
(45) Date of Patent: Jun. 25, 2019

(54) SYSTEM AND METHOD FOR NETWORKED VIDEO CAPTURE, BACKUP, AND SERVING

(71) Applicant: videoNEXT Federal, Inc., Chantilly, VA (US)

(72) Inventors: Andriy Fomenko, Chantilly, VA (US); Chris C. Gettings, Chantilly, VA (US)

(73) Assignee: videoNEXT Federal, Inc., Chantilly, VA (US)

( * ) Notice: Subject to any disclaimer, the term of this patent is extended or adjusted under 35 U.S.C. 154(b) by 0 days.

(21) Appl. No.: 14/716,404

(22) Filed: May 19, 2015

(65) Prior Publication Data
US 2016/0021156 A1 Jan. 21, 2016

Related U.S. Application Data

(60) Provisional application No. 62/001,416, filed on May 21, 2014.

(51) Int. Cl.
*H04L 29/06* (2006.01)
*H04N 21/433* (2011.01)
(Continued)

(52) U.S. Cl.
CPC ..... *H04L 65/4069* (2013.01); *H04N 21/4223* (2013.01); *H04N 21/433* (2013.01); *H04N 21/436* (2013.01)

(58) Field of Classification Search
USPC ........................................ 709/231
See application file for complete search history.

(56) References Cited

U.S. PATENT DOCUMENTS

| | | | |
|---|---|---|---|
| 2007/0024707 A1* | 2/2007 | Brodsky | G08B 13/1961 348/143 |
| 2011/0085033 A1* | 4/2011 | McDonald | H04N 7/18 348/143 |

(Continued)

OTHER PUBLICATIONS

VideoNEXT, "Security Operating System (SOS)," videoNEXT SOS Product Overview, 2013, www.videonext.com, 1 page.
(Continued)

*Primary Examiner* — Hermon Asres
(74) *Attorney, Agent, or Firm* — Nixon & Vanderhye P.C.

(57) ABSTRACT

Transparent backup and archiving of video data for one or more Video Management Systems is provided by capturing such data from at least one network used by the VMS(s) using packet capture by one or more taps and associated Streaming Video Capture and Replay System (SVCRS) and without requiring cooperation from or modification to any VMS. By noting the source and destination of data packets, as well as aspects of the content, such as the data type, format, or protocol used, the nature of the devices sending or receiving the data packets can also be determined. For example, it is possible to determine that a sending device is a camera, and a receiving device is a component of a VMS. Using such information, lists of cameras, VMSs, and clients operating over a network can be created, along with associated information, such as their network addresses. In some cases additional information, such as device capabilities or models, API versions and capabilities, and data storage locations used can also be determined.

19 Claims, 9 Drawing Sheets

(51) Int. Cl.
*H04N 21/436* (2011.01)
*H04N 21/4223* (2011.01)

(56) References Cited

U.S. PATENT DOCUMENTS

| | | | | |
|---|---|---|---|---|
| 2012/0084605 A1* | 4/2012 | Shilon | H04L 43/12 | 714/33 |
| 2012/0158894 A1* | 6/2012 | Desgagne | H04N 21/6125 | 709/217 |
| 2012/0327954 A1* | 12/2012 | Iourtchenko | H04L 65/607 | 370/474 |
| 2013/0271598 A1* | 10/2013 | Mariadoss | G08B 13/19613 | 348/143 |
| 2016/0191591 A1* | 6/2016 | Rider | G06F 17/30 | 709/219 |

OTHER PUBLICATIONS

VideoNEXT, "Security Operating System (SOS) Product Bundles—STRATUS, NIMBUS, ALTUS," STRATUS/NIMBUS/ALTUS Bundles Comparison Chart, 2013, www.videonext.com, 1 page.
NPulse Technologies, "CPX Flow & Packet Capture," Jun. 7, 2013, 2 pages.

\* cited by examiner

SYSTEM AND METHOD FOR NETWORKED VIDEO CAPTURE, BACKUP, AND SERVING

CROSS-REFERENCE TO RELATED APPLICATIONS

This application claims the benefit of U.S. Provisional Patent Application No. 62/001,416 filed May 21, 2014, incorporated herein by reference.

STATEMENT REGARDING FEDERALLY SPONSORED RESEARCH AND DEVELOPMENT

None.

FIELD

The technology herein relates to using diverse systems for collecting, storing, preserving, monitoring and/or retrieving stored data such as video and audio feeds from security systems, traffic cameras, Video Management Systems ("VMS"'s), video monitoring systems, video security systems, traffic monitoring systems, and other sources. In more detail, the exemplary, illustrative technology herein relates to systems and methods for providing filtering, recall, and/or management of devices used for collecting video data from networks, and more particularly to collecting data from a network connecting video stream generation and access systems of diverse design for purposes of archiving data, restoring lost data, and/or providing interim functionality when video stream generation and access systems suffer outages.

BACKGROUND

A common network, such as the Internet, may be used in some scenarios for connections between a VMS and networked cameras and/or clients. Due to the proprietary or non-standard nature of some example VMS implementations, a given client may not be able to access data from different VMSs; just the particular VMS or VMS's the client is designed to work with. Likewise, backup or archiving of data from a VMS is typically done using proprietary or vendor-specific methods that often vary from one VMS to the next, making management of data backup difficult and retrieval of archived data problematic if the VMS that stored it is unavailable.

Data sources, such as cameras, that supply data to a first VMS may not be compatible with a second VMS, resulting in expensive duplication of data sources. VMSs may have diverse data retention requirements (from none to hours, days, or permanently in some cases) and varying regulatory compliance requirements (e.g. HIPA, Sarbanes-Oxley, chain of custody, etc.). In addition, if a VMS becomes or is unavailable, the data it has stored can become inaccessible, even if the data is stored in a location that remains or is available and is in a standard format, because the location of the data is known only to the VMS that stored it.

Solving these and other related problems can result in reduced costs, improved reliability, better retrieval speed, simpler data backup, and additional capabilities.

BRIEF DESCRIPTION OF THE DRAWINGS

These and other aspects and advantages will be best be understood from a detailed description of example non-limiting embodiments for purposes of illustration and shown in the accompanying drawings, of which.

DESCRIPTION OF SOME EXAMPLE EMBODIMENTS

Figure 1:
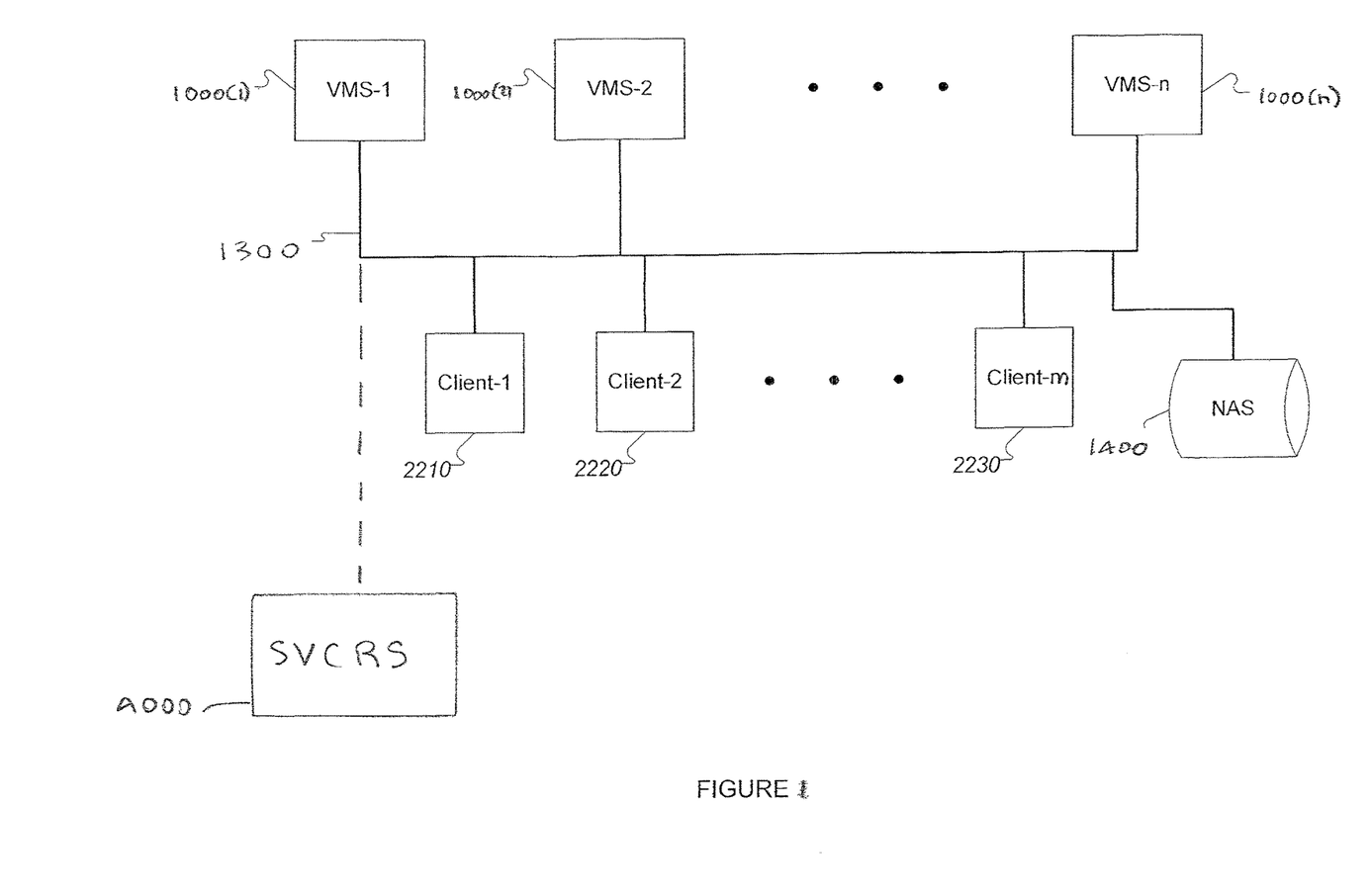
FIG. 1 is a diagram depicting multiple example VMS systems sharing a common network.

VMSs are often employed by enterprises or governments that make use of a plurality of (n=any number of) VMSs for various purposes. FIG. 1 shows an arrangement of a plurality of VMSs (1000(1), 1000(2), . . . , 1000(n)) connected to a plurality of (m=any number of) clients (2210, 2220, & 2230), over a network (1300) that also provides access to network storage (1400). Network (1300) can be any kind of network including but not limited to wired, wireless, the Internet, cellular, satellite, optical or any other networking technology. Network storage 1400 may be used by some VMSs and not others, and may comprise one or more storage systems (only one is shown for clarity).

Figure 2:
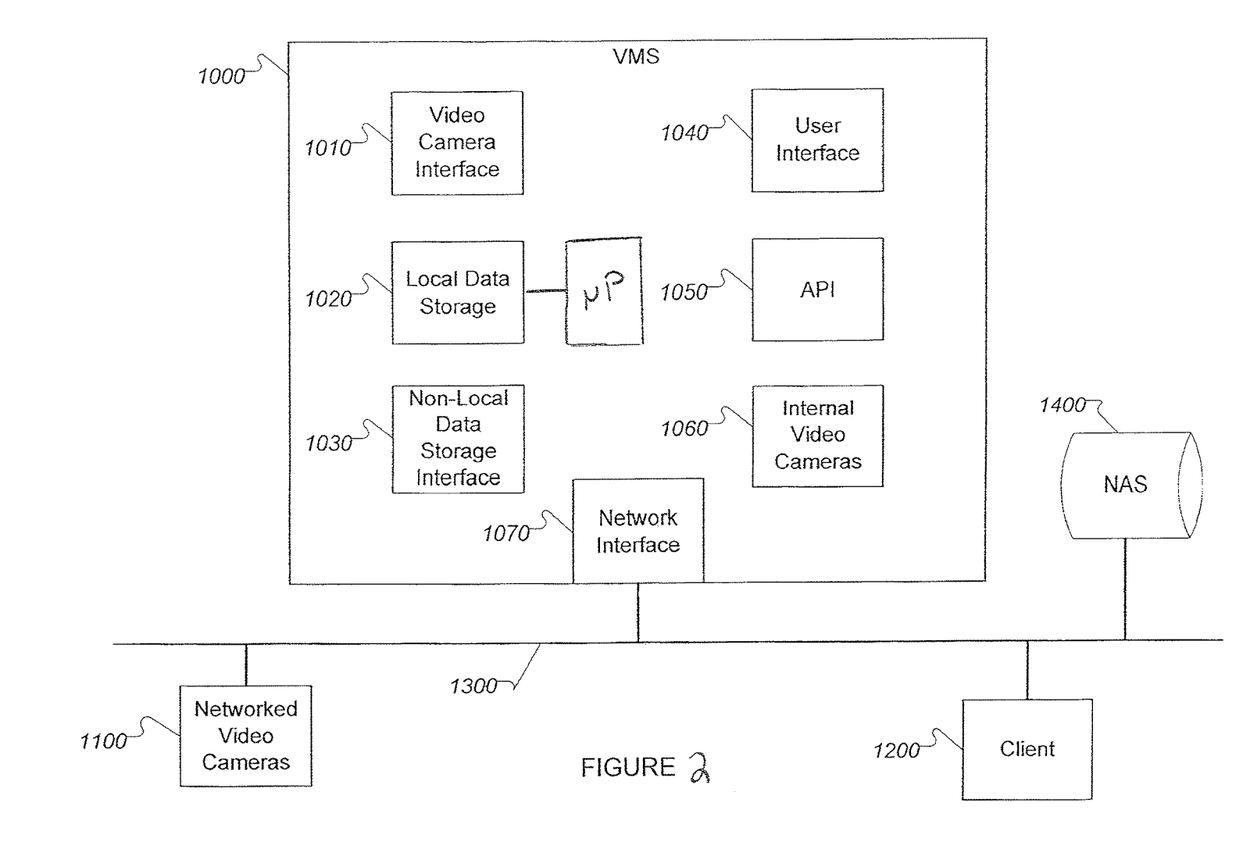
FIG. 2 is a diagram depicting some component parts that comprise an example non-limiting VMS.

Each VMS 1000 shown in FIG. 1 can comprise a number of video capture and other components. FIG. 2 is a diagram depicting some component parts that comprise an example non-limiting VMS (1000) of the type shown in FIG. 1. A VMS (1000) can comprise for example one or more components that may be co-located or distributed in various locations. FIG. 2 shows common logical components, both hardware and software, that may be implemented in many different ways in an actual installation.

An example VMS (1000) comprises one or more network interfaces (1070) for sending and receiving data, commands, or other communications from external sources, such as client workstations (1200) or other client arrangements. Networks (1300) can be standard TCP/IP-based networks, or of other types. Network bandwidths are typically high, e.g., one to ten Gigabits per second or more but can vary with requirements or conditions.

An example VMS (1000) may employ a plurality of video data sources, such as local and/or network-connected cameras (1060, 1100), as well as accessories for some video data sources, such as pan and tilt mounts or zoom lenses. These may be obtained from diverse manufacturers or be of diverse models and capabilities. Video data sources, such as cameras, can be internal (1060) to the VMS, that is, connected directly to other VMS components rather than over a network (1300), or external (1100) and connected to the VMS (1000) over a network (1300). Many VMS's (1000) have both internal cameras (1060) and network-connected cameras (1100). Some VMS's (1000) are themselves distributed architectures wherein different parts of the VMS communicate with one another over a network (1300). Interaction with video cameras and their accessories for purposes of data collection or control is handled by one or more video camera interface components (1010).

Data collected from video data sources can be stored for processing, retrieval, archiving, etc. in local data storage that is part of the VMS (1020), in external storage over a network such as in a Network Attached Storage (NAS) (1400), or both. External storage can be handled by a non-local data storage interface (1030).

An example VMS (1000) can have one or more user interfaces (1040) for monitoring, configuring, or controlling the VMS (1000) and/or for viewing collected data. A VMS (1000) may also have an application programming interface (API) (1050) useful for controlling, configuring, or monitoring the VMS (1000), or retrieving data from it, using software running on other systems.

Example VMSs (1000) transfer data between the VMS (1000) and data sources, such as networked video cameras (1100), storage (1400) (e.g. Network Attached Storage (NAS) or Storage Area Network (SAN)), and clients (1200) (e.g. workstations, browsers, or data processing systems) using standard protocols (e.g. TCP, UDP, FTP, HTTP, RTP (RTC/TCP or RTP/UDP), RCP, RTSP, and RTCP) in standard or other formats (e.g. MPEG 2/4, MJPEG, and H.264), over wired and/or wireless networks (1300).

VMS's 1000 typically process and store data using proprietary methods that vary from one VMS (1000) to the next, or even from one video data source (1100) to the next. Internal data sources, such as cameras, (1060) may or may not transfer data over networks, depending on the design of the VMS (1000). Data can be video, audio, or combined video and audio.

As discussed above, typical VMSs 1000 and associated architectures as shown in FIGS. 1 and 2 communicate (e.g., receive, transmit and distribute) data over networks 1300. In some non-limiting arrangements, data is moved in chunks referred to as "packets". In some non-limiting embodiments, each packet contains information about the system that sent it, where it is being sent, when it was sent, and other information. A given video or data stream, such as a video camera feed, is "packetized" (organized into packets) for transmission. When appearing on the network (1300), one packetized stream may be intermixed on the network with packets from other sources such as cameras, with data being retrieved by a client, with commands being sent to a VMS API 1050 or other component.

Figure 3:
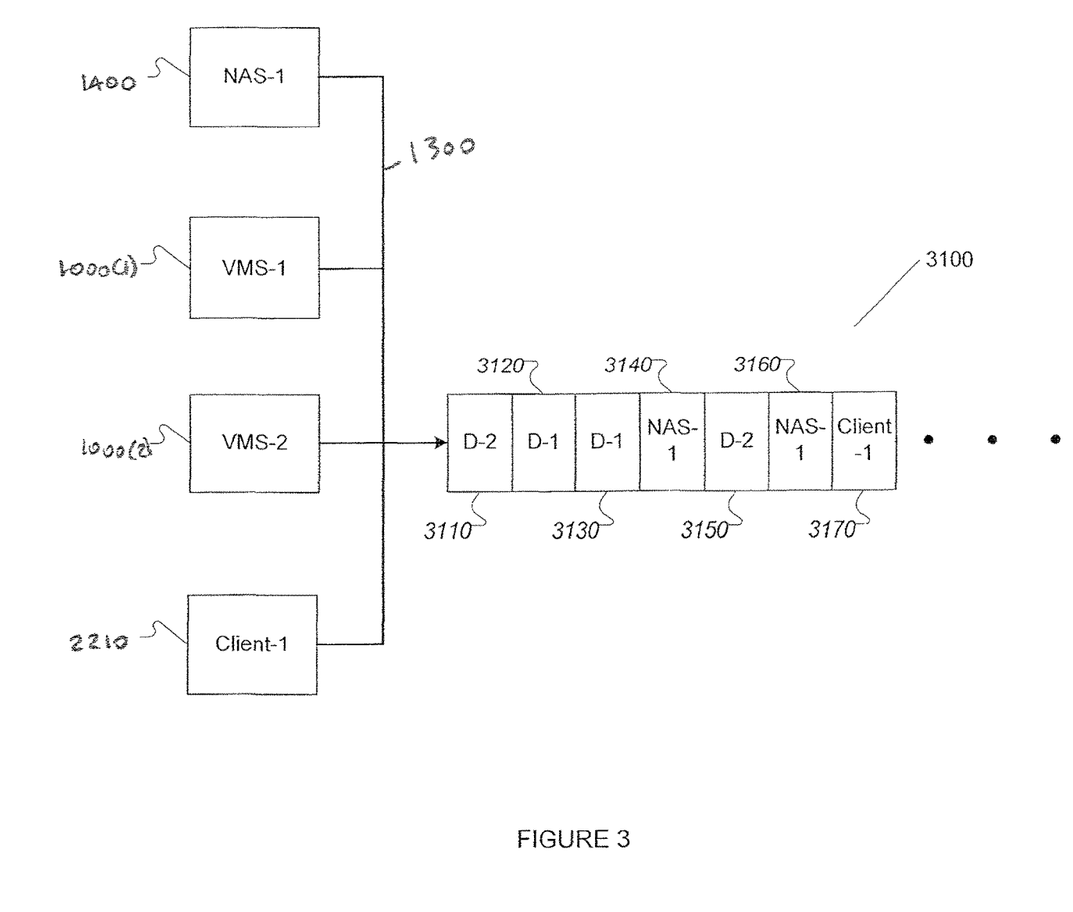
FIG. 3 is a diagram depicting how packets from various networked systems can appear on the network over time.

FIG. 3 shows how packets from various networked systems may appear intermixed on a network 1300 over time. The packet stream (3100) shown has a packet (3110) from VMS-2 (1000(2)) followed by a packet (3120) from VMS-1 (1000(1)) followed by another packet (3130) from VMS-1 (1000(1)) followed by a packet (3140) from NAS-1 (1400) followed by a packet (3150) from VMS-2 (1000(2)) followed by another packet (3160) from NAS-1 (1000(1))), followed by a packet (3170) from Client-1 (2210).

Packets on a typical network will thus contain diverse types of information, be in diverse formats, be part of diverse protocols, be sent from or to different locations, etc. Information in packets can be collected data, commands, messages, software downloads, network management information, or any other type of information. In VMS's 1000 for example, camera data in the form of streamed video can be sent over the network (1300) to VMS processing components, data storage systems, to clients for display, or for other purposes. Commands to camera interfaces 1010, 1100 can also be sent over the network 1300 in at least some cases. Some protocols, such as RTSP (Rapid Spanning Tree Protocol) are used to negotiate camera capabilities, while others, such as RTCP (Real-time Transport Protocol) can be used to set up or maintain connections between cameras 1100 and VMSs 1000.

As shown in FIG. 1, an example non-limiting implementation further includes a Streaming Video Capture and Replay System ("SVCRS") (4000). In many or most commonly used networking systems such as in FIGS. 1 and 2, it is possible for devices other than the intended or designated recipient (e.g., SVCRS 4000) to obtain information sent over the network 1300. Monitoring the network 1300 using hardware and/or software techniques such as packet capture (PCAP), it is possible for SVCRS 4000 to capture packets intended for any recipient, and to pass these to other hardware and/or software for processing, or to store them for later analysis or re-construction. This capability can be used for network monitoring and problem diagnosis, but it is also useful for obtaining VMS 1000 data, such as video streams or camera commands, in a raw and non-proprietary form. Packet capture does not require cooperation from or modification to the source or destination devices of the packets, and is transparent to them.

Because packets sent over networks 1300 often follow common protocols, the source and destination network address of any given packet can often be easily determined, as well as other information about the packet, such as the protocol it is a part of, the time it was sent, the amount of data it contains, etc. Such information once determined can then be used to map or otherwise correlate with associations such as address, person, camera, source, etc. Data is typically sent between VMSs 1000 and clients 2210, 2220, 2230, between cameras 1010, 1100 or storage locations and VMSs, etc., using standard protocols, such as HTTP, FTP, RCP, RTSP, RTCP, SCP, etc. While a VMS 1000 may work with, or store, data in proprietary ways internally, when sending data to clients 2210, 2220, 2230 or external storage 1400, or obtaining data from cameras 1010, 1100, the data typically exists in well known standard formats and is sent using well known standard protocols without encryption or other protection. This is useful to enable SVCRS 4000 to obtain VMS data in non-proprietary forms.

By noting the source and destination of data packets, as well as aspects of the content, such as the data type, format, or protocol used, SVCRS 4000 can also determine the nature of the device(s) sending or receiving the data packets. For example, it is possible to determine that a sending device is a camera 1100, and a receiving device is a component of a VMS 1000. Using such information, SVCRS can create lists of cameras 1100, VMSs 1000, and clients 2210 operating over a network 1300, along with associated information, such as their network addresses. In some cases additional information, such as device capabilities or models, API versions and capabilities, and data storage locations used can also be determined.

The example non-limiting technology herein thus provides methods and apparatus for SVCRS 4000 to perform transparent backup and archiving of video data for one or more VMSs 1000 as shown in FIGS. 1 and 2 by capturing such data from at least one network used by the VMS(s) using packet capture devices and/or software and without requiring cooperation from or modification to any VMS.

The example non-limiting SVCRS 4000 technology herein can extract and store metadata (e.g. second level metadata) from captured video data sufficient to re-construct, both in real-time as packets are captured, and using captured data stored in one or more storage devices, video streams being sent to one or more VMSs.

Example non-limiting embodiments of SVCRS 4000 provide methods and apparatus to dynamically configure network taps of diverse types such that they collect at least the network packets required or useful for the functioning of the Streaming Video Capture and Replay System (SVCRS).

Example non-limiting embodiments of SVCRS 4000 provide an improved method and apparatus for dynamic reconfiguration of video data sources, such as cameras 1100, such that video data is sent to SVCRS rather than to a VMS 1000 during periods when the VMS is not available, and restoring the video data source configuration such that video data is once again sent to the VMS when the VMS is again available.

Example non-limiting embodiments provide methods and apparatus for re-configuration of video data sources, such as cameras 1000, by modifying and sending previously captured network packets involved in configuration of video data sources.

Figure 4:
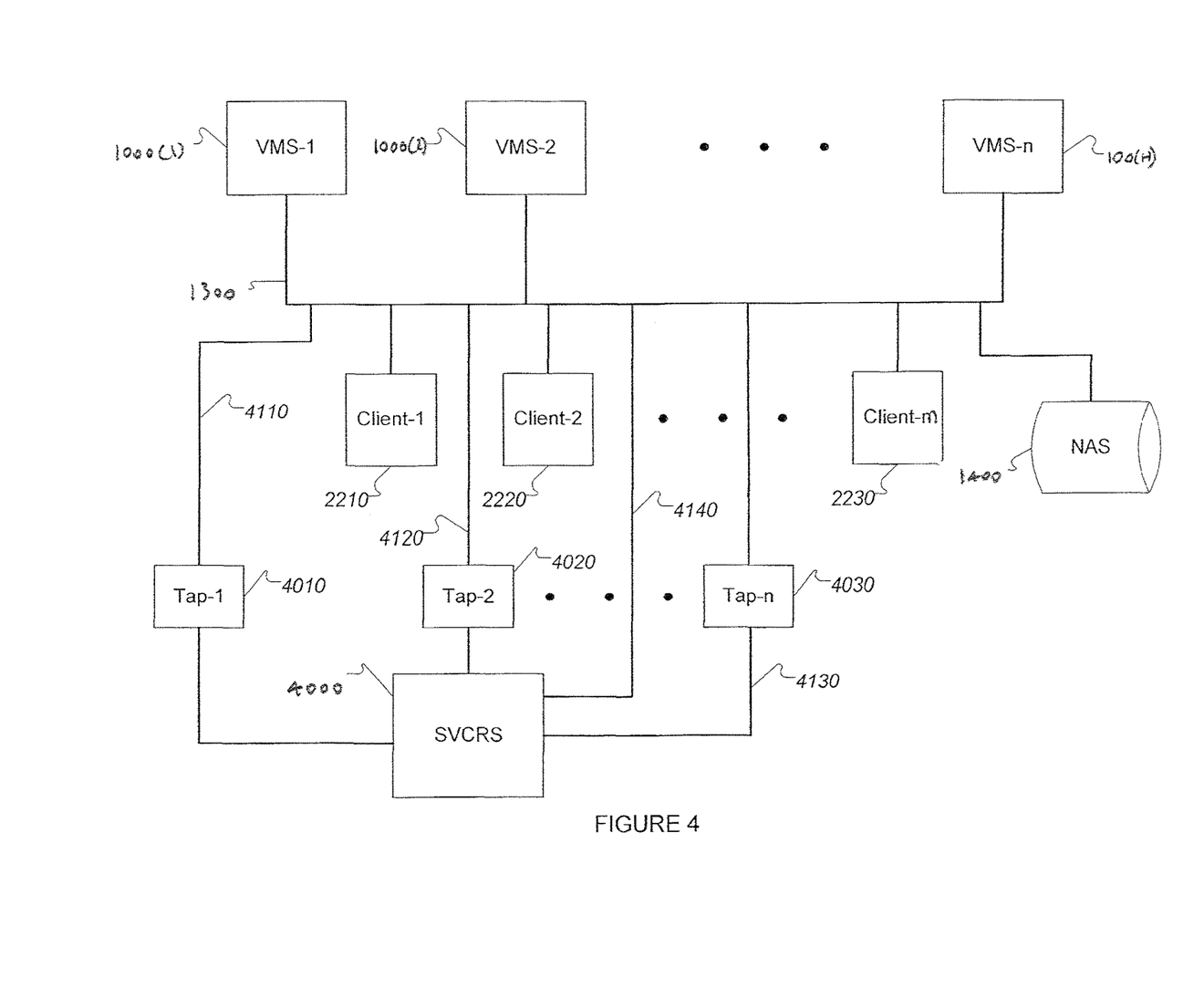
FIG. 4 is a diagram depicting the network of FIG. 1 with a more detailed implementation of packet capture taps and an exemplary Streaming Video Capture and Replay System (SVCRS).

As one example embodiment, FIG. 4 shows a more detailed view of the FIG. 1 system with several packet capture taps (4010, 4020, & 4030) and an exemplary Streaming Video Capture and Replay System (SVCRS) embodiment (4000).

The packet capture taps (4010, 4020, & 4030) are special purpose hardware devices that interface with a network (4110, 4120, & 4130) and capture specified media, video, audio, data and/or other packets from the network (e.g. Capture Probe eXtreme from nPulse Technologies of Charlottesville, Va.). Alternatively, a packet capture tap may be constructed from general purpose computer systems such as laptops, workstations, or servers executing packet capture software such as libpcap, WinPcap, tcpdump, or others. Either or both kinds of taps can be employed by a given SVCRS 4000.

In some non-limiting implementations, taps (4010, 4020, & 4030) (which may be part of SVCRS 4000 or separate from it or both) are configured to collect only packets matching one or more filter specification(s) from those packets traversing the network. For example, taps can be configured to capture only video data packets, only video data packets sent from a particular camera or cameras 1010, 1100, only video data packets being sent to or from a particular network address, etc.

In some non-limiting implementations, taps (4010, 4020, & 4030) store captured packets in tap-local storage for later retrieval, or for buffering/caching when network storage 1400 cannot accept data immediately. In other implementations, taps (4010, 4020, & 4030) store captured packets in networked storage (2300), or pass them to other devices, such as SVCRS (4200), as they are captured. Video information can be stored in a specific file encoded using a video format, or (more preferably in some contexts) the taps can store captured information in raw capture formats. Storage in raw capture formats can result in significantly faster storage responses and eliminates the need for post processing of stored video files. In one example implementation, the storage of captured packets uses the "PCAP" file structure and/or protocols (e.g., libpcap and/or Winpcap).

In some cases taps are connected directly to an SVCRS (4000). In alternative implementations, taps (4140) make use of the network to interface with an SVCRS 4000. In yet other alternative cases, such as with Tap-2 (4020) and Tap-n (4030), taps are not connected directly to an SVCRS (4000) and are reachable through their network connections (4120 & 4130).

In an exemplary implementation, a tap configuration process is performed by an SVCRS (4000). The SVCRS 4000 typically connects to the tap and provides one or more items of configuration specification for the tap to use. In a first exemplary implementation, tap configuration is performed by the SVCRS 4000 utilizing an API provided by the tap. In an alternative exemplary implementation, tap configuration is performed by the SVCRS 4000 by interacting with a web service and/or web page provided by the tap. In still other alternative exemplary implementation, tap configuration is performed by other means (4200) external to an SVCRS 4000 such as by writing a configuration file and rebooting the tap, and/or controlling the tap to get and use a new configuration file. When tap configuration is performed by an SVCRS (4000), in at least some exemplary implementations, the tap configuration is modified at the direction of the SVCRS in order to cause one or more taps (e.g. 4010, 4020, & 4030) to (a) monitor the network(s) 1300 the tap is connected to, (b) to collect one or more packets from the network(s) that meet the configuration specification provided by the SVCRS (4200), (c) to process the collected packets as defined by the configuration specification, (d) calculate metadata associated with the collected packets, and (e) store the collected packets and/or metadata to carry out its functionality. The packets can be stored to the network 1300, and a particular tap is configured to do that such as by using a ccatter/gather, pcap format (not necessarily as streamed files).

Example non-limiting tap configuration specifications can comprise elements that define one or more of packet filtering specifications, packet storage methods, package storage location or locations, captured packet forwarding (e.g. to an SVCRS or to a storage system) specifications, metadata extraction specifications, metadata creation specifications, or specifications that control other aspects of tap operation. When multiple types of taps 4010, 4020, 4030 are used, tap configuration options and the specifications that control them may vary from one tap to another based on the design of the tap.

In some example non-limiting embodiments, tap-collected packets are stored as packets and/or as integrated video streams. If the stream is encoded as MP4 for example, the captured packets are streamed MP4, and are thus encoded. They're not aggregated, and are stored as packets of a stream. A file of collected tap data can contain packets from one or more of cameras 1010, 1100, VMSs 1000, clients 1200, etc. depending on the filtering in effect when the packets were captured. Such packets are typically intermixed and can be separated or filtered, ordered, and rewritten to a storage as part of video stream re-construction. In some implementations, captured packets making up a given video stream are captured by a plurality of taps 4010, 4020, 4030 and/or stored in a plurality of locations.

By making use of captured video data and other network packets, an SVCRS 4000 can capture and store video data sent from cameras 1010, 1100 to VMSs 1000, configure cameras to redirect data to the SVCRS when a VMS is not available, re-configure cameras to direct data to a VMS when it is once again available, and create lists of VMSs and their associated networked cameras 1100.

Figure 5:
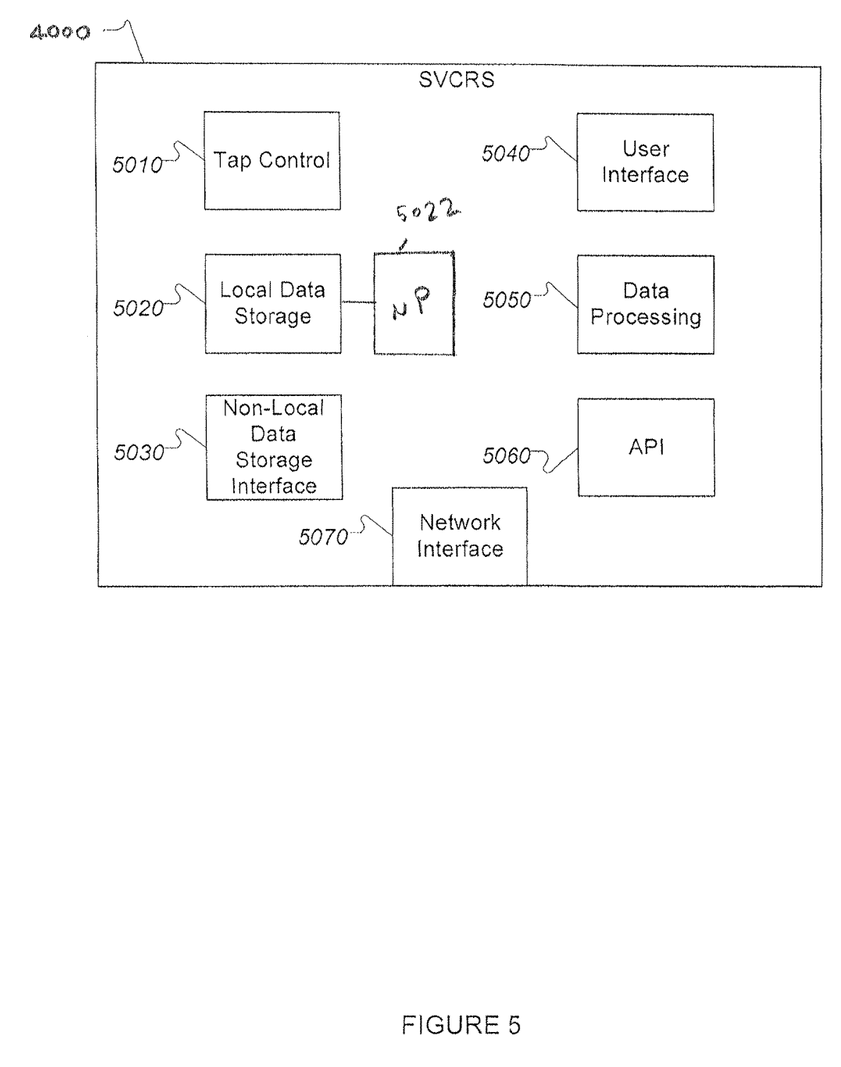
FIG. 5 is a diagram depicting some of the logical components of an SVCRS embodiment.

FIG. 5 shows some of the logical components of a non-limiting SVCRS (4000) embodiment. Exemplary embodiments can comprise additional components that have been omitted for clarity. The following functions and tasks may be used in connection with the FIG. 5 embodiment, which may include one or more processors executing program instructions stored in non-transitory memory:

| Function/Task | Example Implementation |
| --- | --- |
| packet filtering | Selection of a subset of packets that meet a specified requirement, and processing the selected packets differently from those that are not selected. |
| packet capture (PCAP) | Collection of one or more network data packets from a network by a device to which the packet was not addressed. |
| tap | A hardware and/or software device for carrying out packet capture. In some cases taps can also carry out packet filtering. |

The FIG. 5 network interface component (5070) is used to enable network access for a SVCRS 4000 embodiment. An exemplary SVCRS embodiment can have one or more network interfaces 5070, comprising hardware and/or software (including processors as mentioned above) used to connect to a wired or wireless network 1300, to establish communication with other network devices, and to exchange information with them.

Tap control (5010) is useful to configure taps 4010, 4020, 4030, start and stop collection of packets by taps, and to check or monitor the status of taps as needed. Tap control 5010 can comprise a plurality of tap-specific modules suitable for interfacing and configuration of specific types of taps as needed.

Non-transitory local data storage (5020) is useful to store information useful to the SVCRS 4000, such as data collected from taps or retrieved from tap external storage locations, data being processed by the SVCRS, computed results from SVCRS processing of data (e.g. metadata), and software instructions and data useful to the functioning of the SVCRS such as metadata extraction applications and/or tap configuration parameters. Local data storage (5020) can comprise hard drives, optical drives, flash memory devices, RAM, ROM/EPROM/EEPROM, or other data storage devices as will be well understood by those with skill in the art.

The non-local data storage interface component (5030) is useful for carrying out data access or storage to taps 4010, 4020, 4030, NAS 1400, SAN, etc., data storage. The non-local data storage interface (5030) can use any number of protocols to accomplish this, such as HTTP, FTP, SCP, RCP, etc., and can, in at least some exemplary embodiments, present a common interface to non-local storage for other components.

The user interface component (5040) is useful for user entry of requests, tap configuration parameters, or other commands to the SVCRS (4000), and/or output of captured data, computed results, status information, or alerts.

The API (Application Programming Interface) (5060) is useful for remote control, monitoring, etc., of SVCRS 4000 by software executing on other devices, such as workstations or servers. The API 5060 can enable external configuration of taps 4010, 4020, 4030 using a common tap configuration specification syntax (which the SVCRS 4000 translates into tap-specific configuration parameters), access to SVCRS local data storage (5020), monitoring or control of SVCRS functionality, etc.

Data processing (5050) carries out processing of data, commands, and other such tasks for the SVCRS (4200). Processing can comprise any of packet filtering, metadata extraction, second level metadata extraction, stream reconstruction, generation of alerts, generation of user reports, support for API functionality, etc.). Data processing 5050 can be performed separately or by an additional microprocessor 5022 coupled to local data storage 5020, which in turn stores executable instructions for execution by the microprocessor.

Figure 6:
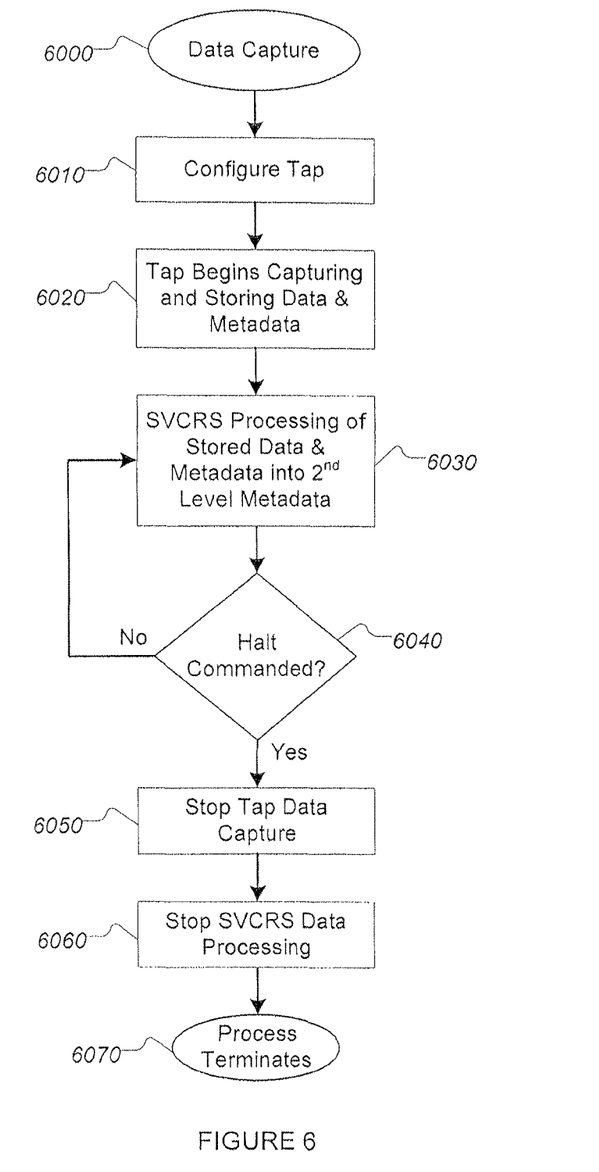
FIG. 6 is a flowchart depicting an exemplary process for data capture by an exemplary SVCRS embodiment.

FIG. 6 is a flowchart showing an exemplary process for data capture by an exemplary SVCRS 4000 embodiment. The process (6000) (which can be implemented by hardware and/or executed by one or more processors based on software instructions stored in non-transitory memory, or any combination thereof) starts with tap configuration (6010). One or more taps 4010, 4020, 4030 are configured so as to cause them to capture the packets required by the SVCRS 4000. In some scenarios this can be capture of all packets. In alternative scenarios, taps 4010, 4020, 4030 are configured to selectively capture (i.e. filter) a sub-set of packets. When there are a plurality of taps 4010, 4020, 4030, taps may or may not be configured identically. For example, a first set of taps 4010, 4020, 4030 can be configured to capture data from a first set of sources, while a second set of taps 4010', 4020', 4030' can be configured to capture data from a second set of sources. Filtering is specified based one or more filter specifications used to manage the filtering, and can for example be based on one or more packet characteristics or content, such as by network, packet transport or application type (e.g. HTTP, RTP, FTP, RTSP, RTCP, etc.), by data format (e.g. MPEG 2/4, MJPEG, H.264, video, audio, etc.), by source address, by destination address, or by any other packet or data characteristic. Filter specification methods can vary from one type of tap 4010, 4020, 4030 to another. For example, a first tap 4010 may use filter specifications using command line options, while a second tap 4020 may have filtering specified by use of one or more API function invocations, and a third tap 4030 may accept filter specifications in the form of an XML document. In some cases a tap 4010 can support filter specification by a plurality of methods. An example of a command line for tcpdump to capture packets sent between "cam1" and "vms1" is:

tcpdump host cam1 and vms1

Once configured and started, taps 4010, 4020, 4030 begin capturing packets (6020). In some implementations, taps 4010, 4020, 4030 perform initial metadata generation (e.g. time stamping, creation of source and destination records, capturing tap ID tagging, etc.), while in alternative implementations metadata generation is done by an SVCRS 4000, storage systems or other systems. Metadata needed by an SVCRS 4000 is obtainable from storage systems or other systems using known methods, such as standard protocols (e.g. NFS, FTP) or APIs.

As captured data becomes available, SVCRS 4000 processing of the data begins (6030). Processing comprises metadata extraction (i.e. data about the data, such as time stamping collection time, creation of source and destination records, capturing tap ID tagging, etc.), and second level metadata creation (i.e. metadata about the metadata and data, such as where metadata is stored, where individual packets are stored, data about which data streams each packet belongs to and where in the stream it fits, or the type of data (video stream, camera command, stream configuration, etc.)). Packet association with specific video data streams is done using packet addresses, sequence numbers, and other packet-based information in at least some exemplary embodiments where each camera sends only one video data stream at a time. In one non-limiting embodiment, all video data stream packets sent from a given camera 1010, 1100 to a given VMS 1000 comprise a single video data stream. Second level metadata about where packets are stored is determined through API calls to network storage systems 1400 in some exemplary embodiments. In alternative exemplary embodiments second level metadata about where packets are stored is determined by matching stored data to packet content.

Capture of packets and processing and storage of data and metadata continues until the SVCRS 4000 determines that it should halt (6040). Such determination in various exemplary implementations is done as a result of a user command, an API call, an error condition (e.g. storage becomes full), or other cause as determined to be proper by those with skill in the art. When packet capture and processing is halted (6040), taps 4010, 4020, 4030 are commanded to cease capture of packets (6050), and SVCRS data processing is halted in some exemplary implementations. In an alternative exemplary implementation, the SVCRS is permitted to complete processing of already captured packets prior to being halted (6060). Once capture and processing are halted, the process is complete (6070).

Figure 7:
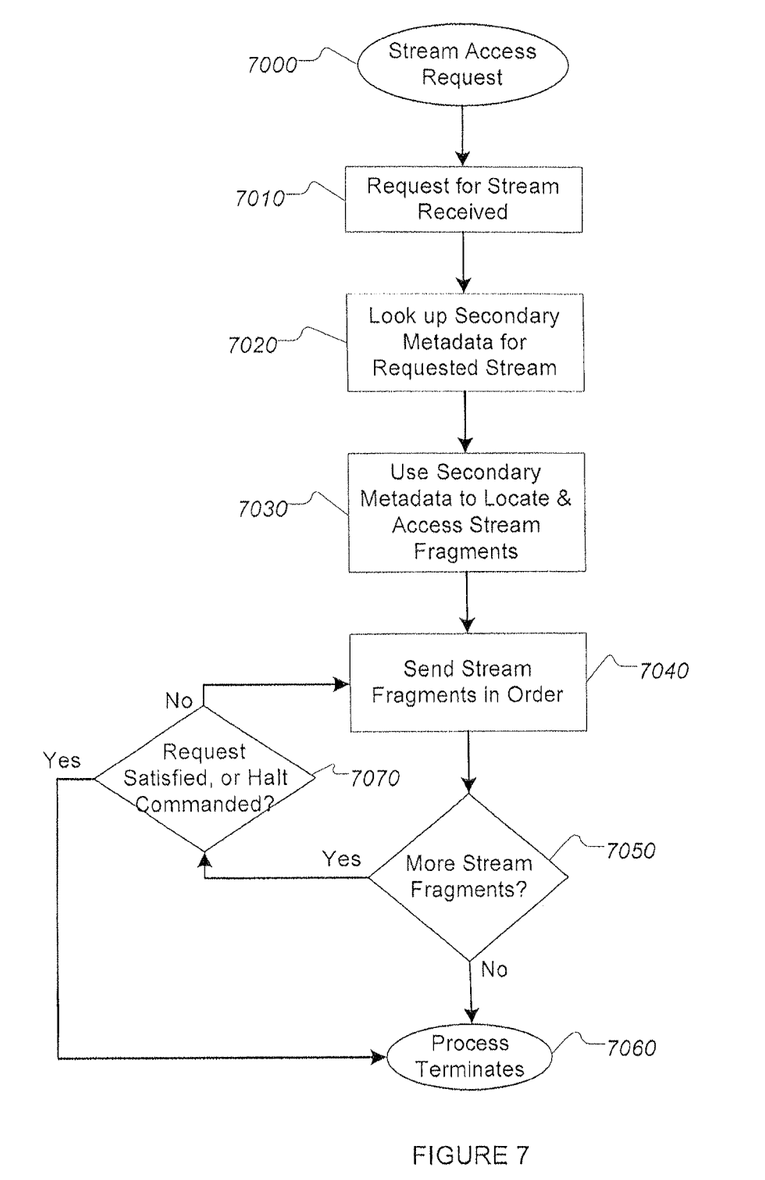
FIG. 7 is a flowchart depicting the steps involved in an exemplary process for responding to a stream access request.

FIG. 7 is a flowchart showing example steps involved in an exemplary process for the SVCRS 4000 to respond to a stream access request (7000) (i.e. a request from a user, API function, or client that packets comprising a video stream be displayed or otherwise sent to the requester and/or a requested destination (e.g. such as a network attached display device that drives a large screen). The process (which may be performed by hardware and/or executed by a processor based on instructions stored in non-transitory memory) starts with the SVCRS 4000 receiving a request for a stream (7010) that specifies, as parameters, one or more attributes of the stream being requested. Such specification can comprise any or all of a data source or destination identifier, a data source or destination address, an video encoding method and/or protocol, a stream name, time ranges, or a unique identifier that enables the SVCRS 4000 to determine which stream(s) is(are) being requested. The SVCRS 4000 then accesses secondary metadata storage and locates the secondary metadata conforming to the requested parameters, and uses that metadata to identify the requested stream (7020). Secondary metadata is located in SVCRS 4000 local storage in some exemplary implementations. In an alternative exemplary implementation, secondary metadata is located on network accessible storage 1400. In yet other alternative exemplary implementations, secondary metadata is located on both local and network accessible storage 1400. Secondary metadata may or may not be less voluminous than original captured data.

Using the secondary metadata, the SVCRS 4000 locates the stored packets that make up the requested stream and begins accessing each of the packets (7030). The SVCRS 4000 then assembles the packets into the original (or other desired) order, and begins transmitting the packets to the requestor (or to the specified destination) (7040). The SVCRS 4000 does not need to wait until the entire stream has been assembled before it begins sending. In implementations where "live access" is desired, packets are sent to the requester as they become available (e.g. as they are initially stored after the packets are captured). Packets are sent until there are no more packets in the requested data stream (7050), or until the request is satisfied (e.g. the request was for a portion of an available stream, such as those packets captured between a start time and an end time), or is a halt is commanded (7070) by the requestor, the SVCRS UI, an API function, or other source of SVCRS commands, sending of packets stops and the process is complete (7060).

Figure 8:
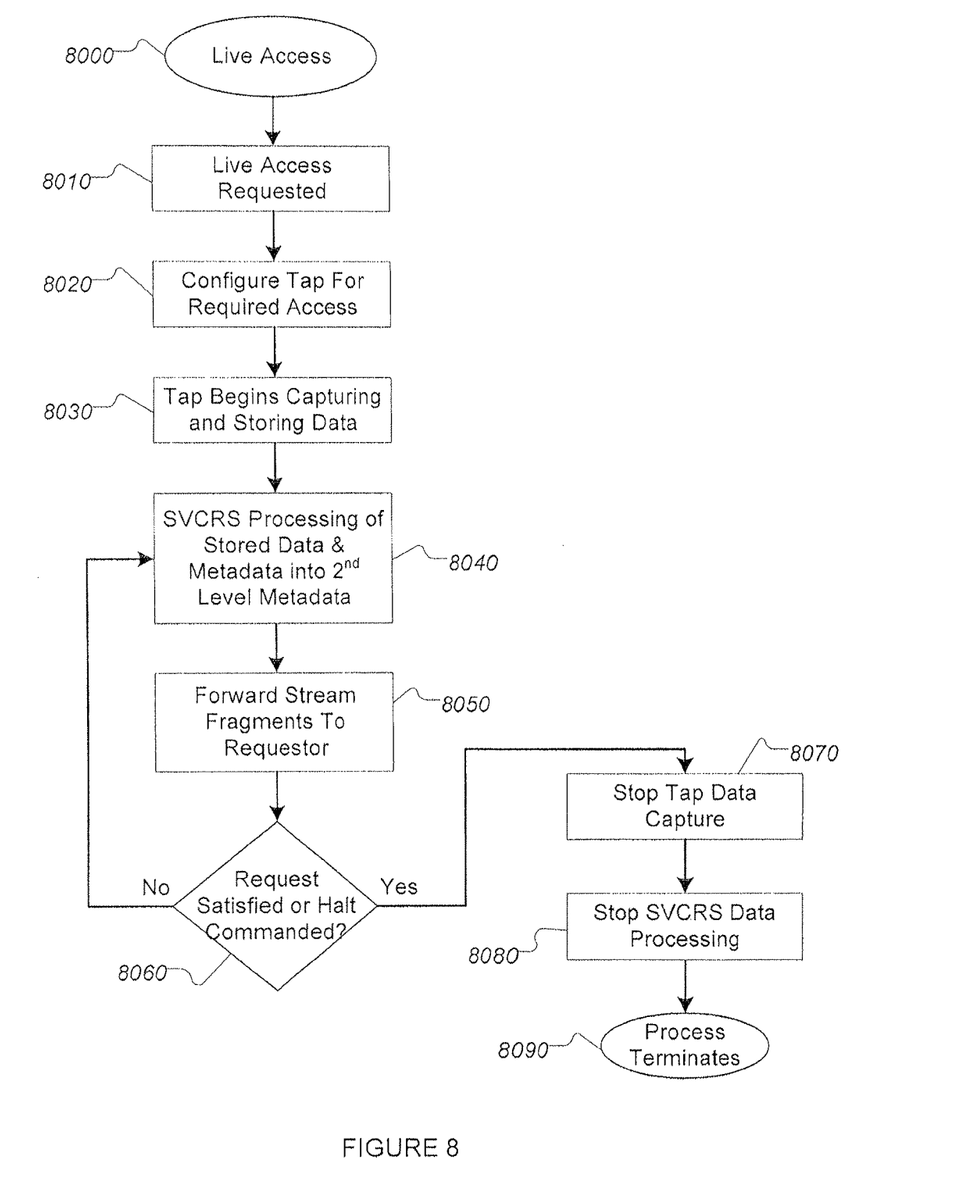
FIG. 8 is a flowchart depicting an exemplary process for live access to data streams.

FIG. 8 is a flowchart of an exemplary process for live access to data streams. Live access is a process that enables a requester to receive data from one or more data streams, even when those data streams are not directed at the requester, or are being sent using protocols the requester cannot process. In some exemplary embodiments, transport protocols are converted from a type used by a camera 1100 to a type usable by a requester. For example, a camera 1100 sends a video stream using RTP over UDP, and an SVCRS 4000 sends the video stream to a requester using an RTSP-negotiated RTP/RTCP over TCP. In some exemplary embodiments, an SVCRS 4000 also performs data format conversion to convert captured stream data into a format usable by a requester (for example, converting from MPEG 2/4 to H.264).

The live access process (8000) (which can be performed by hardware and/or a processor executing software instructions stored in non-transitory memory) begins with a live access request (8010) being received by a SVCRS 4000 (e.g. through a user interface or API function). The request specifies the stream or streams being requested, and any protocol, data format, or other parameters relevant to the request. The SVCRS 4000 then performs any required tap configuration needed to collect the requested video stream(s) (8020). The tap or taps 4010, 4020, 4030 so configured then collect the data, and optionally generate associated metadata depending on the configuration and capabilities of the individual tap (8030). The SVCRS 4000 then processes the data and/or metadata to produce the second level metadata needed to access the packets comprising the requested data streams (8040), and forwards the stream packets to the requester (8050). The collection, processing, and forwarding continues until the request is satisfied or a halt is commanded (8060), at which point the tap or taps 4010, 4020, 4030 are commanded or reconfigured to stop collecting data for the request (8070), the SVCRS 4000 stops processing packets for the request (8080), and the process is complete (8090).

Figure 9:
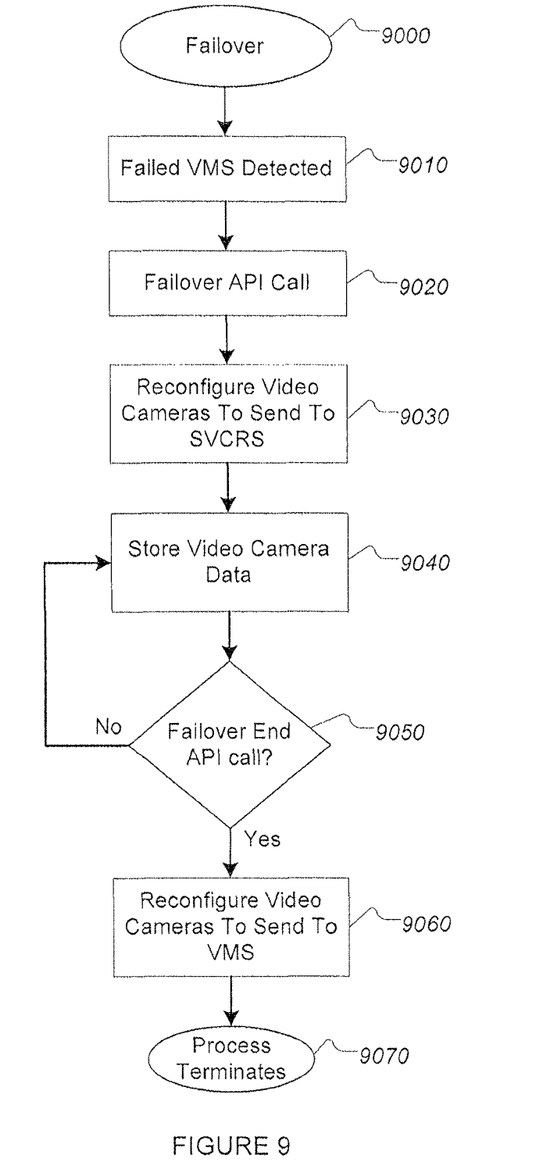
FIG. 9 is a flowchart depicting an exemplary process for VMS failover.

FIG. 9 is a flowchart of an exemplary process for VMS failover (9000). VMS 1000 failover is a process for continuing to capture and store a VMS 1000's video stream data in the event that a VMS fails, becomes unreachable, or is otherwise unable to receive its camera data. The process begins when a VMS 1000 is detected as failed by the SVCRS 4000 (block 9010). Detection of VMS 1000 failure is accomplished, in some exemplary implementations, by the SVCRS 4000 detecting that the VMS is no longer responding to network requests (e.g. failure to respond to "ping" or API instructions). In other exemplary implementations, the SVCRS 4000 detects the failure of a VMS 1000 by detecting the cessation of network traffic between network-attached cameras 1100 and the VMS. Detection, in some exemplary implementations, occurs when a user notices the failure and enters a command to signal the failure to an SVCRS 4000. In an alternative exemplary implementation, a network management monitoring function determines that a VMS 1000 has failed and signals the failure to an SVCRS 4000. Once a VMS 1000 failure condition has been detected, the SVCRS 4000 failover process is initiated by an API call, or by other means (9020). Such failover process can be performed by hardware and/or software such as by one or more processors executing program instructions stored in non-transitory memory.

The SVCRS 4000 failover processing then reconfigures the video cameras 1010, 1100 of the failed VMS 1000 to begin sending data to the SVCRS (9030). The video cameras 1010, 1100 that are to be reconfigured are determined by the SVCRS 4000 through prior monitoring of network interactions, such as sending of data streams, between the camera and the VMS 1000, or from saved data or metadata related to such network interactions. Video camera 1010, 1100 reconfiguration is accomplished in at least some exemplary implementations by using previously captured packet data that contains the interactions between the failed VMS 1000 and the various cameras 1010, 1100 necessary to configure the cameras to send video data to the VMS. In some cases, the previously captured packet data will desirably be modified, such as substitution of the SVCRS 4000's network address for that of the failed VMS 1000. In some cases such replay of modified packet captures is insufficient, such as when cameras 1010, 1100 require non-repeatable authentication, or have non-alterable configuration settings that limit sending to the VMS network address. In such cases information or mechanisms to enable camera configuration must be supplied to the SVCRS 4000, such as through a library of camera API functions, or camera configuration must be accomplished by means external to the SVCRS.

Once video cameras 1010, 1100 have been reconfigured to send data to the SVCRS 4000, the SVCRS stores the video camera data (9040), as well as continuing its normal functionality for metadata generation and storage, replay of saved video streams from stored data, etc. This continues until the SVCRS 4000 API function, command, or other input is invoked to end failover processing (9050), at which time the SVCRS reconfigures the video cameras to send data to the VMS (9060), and the process is complete (9070).

Using the above methods, a SVCRS 4000 enables clients or other VMSs 1000 to access data from VMSs that they are not compatible with, enable VMSs to collect data from data sources they are not compatible with thus eliminating the need for duplicate data sources, backup and restore VMS data so VMS storage failures do not lose data, and provide failover functionality so that VMS data is not lost during a VMS failure. This results in reduced costs, improved reliability, better retrieval speed, simpler data backup, and additional capabilities not currently present in VMS 1000 or multiple VMS systems.

It will be recognized by those skilled in the art that, while the invention has been described above in terms of example non-limiting embodiments, it is not limited thereto. Various features and aspects of the above described invention may be used individually or jointly. Further, although the technology herein has been described in the context of implementation in a particular environment, and for particular applications (e.g. VMS data backup, archiving, and serving), those skilled in the art will recognize that its usefulness is not limited thereto and that the present invention can be beneficially utilized in any number of environments and implementations where it is desirable to transparently capture data while it is in transit on a network, store it for recall, and/or service requests for the data when the normal request server is not available. Thus, while the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the claims.

What is claimed:

1. A method comprising:
   (a) intercepting, capturing and storing in at least one storage device, with at least one network-connected tap connected to a network between at least one source node and at least one destination node, packets of plural packetized video streams being streamed over the network from the at least one source node to the at least one destination node;
   (b) with at least one processor operatively coupled to the at least one storage device, generating first level and second level metadata for the captured stored packets, the first level metadata comprising data about the data in the captured stored packets, the second level metadata comprising data about the first-level metadata including data about which of the plural packetized video streams the captured stored packets belong to and where in the plural packetized video streams the captured stored packets fit, the at least one processor generating the second-level metadata based on at least (i) the first-level metadata, and (ii) analyzing data of the captured stored packets;
   (c) receiving a request for a particular video stream; and
   (d) in response to the request for the particular video stream, the at least one processor using the first and second level metadata to identify captured stored packets associated with the requested particular video stream and where the identified captured stored packets fit within the requested particular video stream, and streaming said identified captured stored packets from the at least one storage device in a sequence based at least in part on the second-level metadata, thereby enabling reconstruction and streaming of the requested particular video stream from the storage device on demand,
   wherein the tap comprises a special purpose hardware device that interfaces with the network, the method further includes filtering the packets to capture and store, the tap intermixes the filtered packets of the plural packetized video streams in the at least one storage device, and the at least one processor separates and orders the packets as part of video stream reconstruction.

2. The method of claim 1 wherein the at least one source node comprises a camera.

3. The method of claim 2 wherein the at least one tap comprises a streaming video capture and replay system.

4. A system comprising:
   at least one network-connected tap, connected to a network intermediate of at least one source node and a destination node, the at least one network-connected tap being operatively coupled to at least one processor configured to control the at least one network-connected tap to intercept, capture and store in a storage device, packets of packetized video streams being streamed over the network from the at least one source node to the destination node;
   the at least one processor being further configured to create first level and second level metadata associated with the captured stored packets, the first level metadata comprising data about the data in the captured stored packets, the second level metadata comprising data about the first-level metadata including data about which packetized video streams the packets belong to and where in the packetized video streams the packets fit, the at least one processor generating the second-level metadata in response to (i) the first-level metadata, and (ii) analyzing data of the captured stored packets;
   the storage device being operatively coupled to the processor, the processor being further configured to store the created first and second level metadata;
   the at least one processor being further configured to receive a request for a particular video stream;
   wherein the at least one processor is further configured to, in response to the received request, use the created first and second level metadata to identify captured stored packets in the storage device that correspond to the requested particular video stream and where the identified stored packets fit within the requested particular video stream, and to stream said identified captured stored packets from the storage device in a sequence based at least in part on the second-level metadata, thereby enabling reconstruction and streaming of the requested particular video stream from the storage device on demand, wherein the tap comprises a special purpose hardware device that interfaces with the network and filters the packets to capture and store, the tap intermixing the filtered packets of the plural packetized video streams in the at least one storage device, and wherein the at least one processor separates and orders the packets as part of video stream reconstruction.

5. The system of claim 4 wherein the source node comprises a video camera.

6. The system of claim 5 wherein the at least one tap comprises a streaming video capture and replay system.

7. A non-transitory storage device storing instructions that, when executed by at least one processor that is part of a network-connected node connected to a network between at least one streaming video source and at least one streaming video destination, cause the at least one processor to:

(a) access, from at least one storage device, packets of plural packetized data streams a tap intercepted, captured and stored in the at least one storage device, the packets of plural packetized video streams having being sent over the network from the at least one streaming video source to the at least one streaming video destination;

(b) create first level metadata corresponding to the captured stored packets, the first level metadata comprising data about the data in the captured stored packets;

(c) analyze data of the captured stored packets;

(d) create second level metadata corresponding to the captured stored packets in response to at least the first level metadata and the analysis, the second level metadata comprising data about the first-level metadata including data about which of the plural packetized video streams the captured stored packets belong to and where in the plural packetized video streams the captured stored packets fit;

(e) store the created first level and second level metadata;

(f) receive a request for a particular packetized video stream;

(g) in response to the received request, use the stored first level and second level metadata to identify captured stored packets in the storage device that are part of the requested particular packetized video stream; and (h) in response to the request, stream at least fragments of said requested particular packetized video stream over the network from the storage device, the fragments comprising captured stored packets identified by the second level metadata in a predetermined order responsive to the second level metadata, thereby enabling reconstruction and streaming of the requested particular packetized video stream from the storage device on demand wherein the tap comprises a special purpose hardware device that interfaces with the network and filters the packets to capture and store in the at least one storage device, the tap intermixing the filtered packets of the plural packetized video streams in the at least one storage device, and wherein the instructions control the at least one processor to separate and order the packets as part of video stream reconstruction.

8. A system comprising:

at least one video tap disposed on a network between at least one video source and at least one video destination, the video tap being configurable to capture selected video packets streamed over the network from the at least one video source to the at least one video destination;

a control device operatively coupled to the at least one video tap, the control device including at least one processor that creates first level metadata and second level metadata for the captured selected video packets, the first level metadata comprising data about the data in the captured packets, the first level metadata including at least one of (i) time stamping collection time, (ii) creation of source and destination records, and (iii) capturing tap identifying tagging; the second level metadata comprising data about the first-level metadata including at least one of (iv) where the metadata associated with a packetized video stream is stored, (v) where data packets for a packetized video stream are stored, and (vi) data about which packetized video stream each packet belongs to and where in the packetized video stream each packet fits;

the at least one processor generating the second-level metadata based on at least (i) the first level metadata and (ii) analyzing data of the captured stored packets;

the control device receiving a request to stream at least part of a particular packetized video stream and in response to the request, using the created first level and second level metadata to identify and retrieve captured stored packets to stream over the network in response to the request, thereby enabling reconstruction and streaming of the requested particular video stream from the storage device on demand, wherein the video tap comprises a special purpose hardware device that interfaces with the network and filters the packets to capture and store, the tap intermixing the filtered packets of the plural packetized video streams, and wherein the at least one processor separates and orders the packets as part of video stream reconstruction.

9. The system of claim 8 wherein the control device comprises a streaming video capture and replay system.

10. The system of claim 8 wherein the network comprises a TCP/IP network.

11. The system of claim 8 wherein the network comprises the Internet.

12. The system of claim 8 wherein the video tap comprises a packet capturing device.

13. The system of claim 8 wherein the video tap locally stores the captured stored packets.

14. The system of claim 8 wherein the video tap buffers the captured stored packets and stores the captured stored packets remotely on network-connected storage.

15. The system of claim 8 wherein the at least one source comprises at least one camera.

16. The system of claim 8 wherein the control device reorders and converts the captured stored packets.

17. The system of claim 8 wherein control device creates lists of video cameras based on observed network traffic.

18. The system of claim 8 wherein the packetized video streams are encoded in a non-standard form.

19. The method of claim 1 wherein the first level metadata includes at least one of (i) time stamping collection time, (ii) creation of source and destination records, and (iii) capturing tap identifying tagging; and the second level metadata comprises at least one of (iv) where the metadata associated with a stream is stored, (v) where stream data packets are stored, and (vi) data type.

* * * * *

UNITED STATES PATENT AND TRADEMARK OFFICE
CERTIFICATE OF CORRECTION

Page 1 of 1

PATENT NO. : 10,334,004 B2
APPLICATION NO. : 14/716404
DATED : June 25, 2019
INVENTOR(S) : Andriy Fomenko et al.

It is certified that error appears in the above-identified patent and that said Letters Patent is hereby corrected as shown below:

On the Title Page

Item (72) Inventors:
Change Chris C. Gettings, Chantilly, VA (US)
To Christopher C. Gettings, Chantilly, VA (US)

Signed and Sealed this
Seventeenth Day of September, 2019

Andrei Iancu
*Director of the United States Patent and Trademark Office*